United States Patent
Toba et al.

(10) Patent No.: US 10,657,922 B2
(45) Date of Patent: May 19, 2020

(54) ELECTRONIC DEVICES, METHOD OF TRANSMITTING DATA BLOCK, METHOD OF DETERMINING CONTENTS OF TRANSMISSION SIGNAL, AND TRANSMISSION/RECEPTION SYSTEM

(71) Applicant: SONY CORPORATION, Tokyo (JP)

(72) Inventors: Kazuaki Toba, Kanagawa (JP); Gen Ichimura, Tokyo (JP)

(73) Assignee: SONY CORPORATION, Tokyo (JP)

( * ) Notice: Subject to any disclaimer, the term of this patent is extended or adjusted under 35 U.S.C. 154(b) by 75 days.

(21) Appl. No.: 14/652,207

(22) PCT Filed: Jan. 7, 2014

(86) PCT No.: PCT/JP2014/050093
§ 371 (c)(1),
(2) Date: Jun. 15, 2015

(87) PCT Pub. No.: WO2014/109322
PCT Pub. Date: Jul. 17, 2014

(65) Prior Publication Data
US 2015/0325201 A1    Nov. 12, 2015

(30) Foreign Application Priority Data
Jan. 11, 2013    (JP) .................................. 2013-003346

(51) Int. Cl.
*H04N 7/01*      (2006.01)
*H04N 5/38*      (2006.01)
(Continued)

(52) U.S. Cl.
CPC ............. *G09G 5/003* (2013.01); *G09G 5/006* (2013.01); *H04N 5/38* (2013.01); *H04N 7/01* (2013.01);
(Continued)

(58) Field of Classification Search
CPC ....... H04N 7/01; H04N 21/43635; H04N 5/38
See application file for complete search history.

(56) References Cited

U.S. PATENT DOCUMENTS

2010/0188567  A1*  7/2010  Ichimura ................ G09G 5/006
                                                                                                    348/441
2011/0285916  A1   11/2011  Takiduka
(Continued)

FOREIGN PATENT DOCUMENTS

EP      2028853 A      2/2009
JP      2012-039476 A  2/2012

OTHER PUBLICATIONS

European Extended Search Report received for European Patent Application No. 14737928.3, dated May 4, 2016, p. 11.

*Primary Examiner* — Matthew Salvucci
(74) *Attorney, Agent, or Firm* — Chip Law Group

(57) ABSTRACT

Damaging a device that is not compatible with a functional extension is to be avoided.

A signal is transmitted to an external device through a transmission channel. A data block containing capability information indicating existence/non-existence of compatibility with an extended function is received from the external device through the transmission channel.

A layer field that indicates the connection layer is provided in this data block. A check is made to determine whether all the devices existing in the path are compatible with the extended function based on the value of the layer field provided in the data block, and the contents of the transmission signal are then determined.

6 Claims, 8 Drawing Sheets

(51) Int. Cl.
*H04N 21/4363* (2011.01)
*G09G 5/00* (2006.01)
*H04N 21/45* (2011.01)

(52) U.S. Cl.
CPC ... *H04N 21/4516* (2013.01); *G09G 2370/042* (2013.01); *G09G 2370/047* (2013.01); *G09G 2370/06* (2013.01); *G09G 2370/12* (2013.01); *H04N 21/43635* (2013.01)

(56) References Cited

U.S. PATENT DOCUMENTS

2012/0044985 A1\* 2/2012 Tao ................. H04N 21/23436
　　　　　　　　　　　　　　　　　　375/240.01
2012/0229706 A1　　9/2012 kabuto \* cited by examiner

FIG. 4

EXAMPLE OF Vendor VSDB

| Byte# | 7 | 6 | 5 | 4 | 3 | 2 | 1 | 0 |
|---|---|---|---|---|---|---|---|---|
| 0 | Vendor-specific tag code (=3) | | | | Length (=N) | | | |
| 1 | 24-bit IEEE Registration Identifier | | | | | | | |
| 2 | | | | | | | | |
| 3 | | | | | | | | |
| 4 | Layer field | | | | | | | |
| ... | | | | | | | | |
| N | | | | | | | | |

ELECTRONIC DEVICES, METHOD OF TRANSMITTING DATA BLOCK, METHOD OF DETERMINING CONTENTS OF TRANSMISSION SIGNAL, AND TRANSMISSION/RECEPTION SYSTEM

TECHNICAL FIELD

The present technology relates to electronic devices, a method of transmitting a data block, a method of determining contents of a transmission signal, and a transmission/reception system, and more particularly, to an electronic device and the like that can avoid damaging a device that is not compatible with a functional extension.

BACKGROUND ART

In recent years, HDMIs (High Definition Multimedia Interfaces) have been widely used as digital interfaces connecting CE (Consumer Electronics) devices, and have become a de facto standard in the industry. In this case, it is possible to employ a system configuration in which an HDMI repeater exists in the path between an HDMI source and an HDMI sink (see Patent Document 1, for example).

CITATION LIST

Patent Document

Patent Document 1: JP 2012-039476 A

SUMMARY OF THE INVENTION

Problems to be Solved by the Invention

In a case where a unique functional extension is to be performed with an HDMI VSDB (Vendor Specific Data Block), the HDMI repeater existing between the HDMI sink and the HDMI source might transmit the VSDB to the HDMI source, without comprehending the contents of the VSDB. A unique functional extension may be a change in the PHY (physical layer) specification, compatibility with a new application, or the like.

A possible change in the PHY specification is an increase in the transmission rate, an increase in the number of transmission lanes, a change in the coding method, a change in the signal amplitude, a change in the clock transmission method, a support in bidirectional transmission, a mode to transmit data other than video data, or the like. Compatibility with a new application might be compatibility with a new 3D format, a new 3D video transmission method, compatibility with or a transmission method for a new video format, a new audio transmission method, a high-efficiency video transmission method, compatibility with a new inter-device control method, or the like.

In a case where the above described functional extension is performed, there is a possibility that the HDMI source will output a contents signal in accordance with the configuration/capability indicated by the VSDB, and damage the HDMI repeater not compatible with the extended function.

FIG. 9 is a schematic diagram illustrating operation that is originally expected in a transmission/reception system formed with a source device, a repeater device, and a sink device. In this drawing, "PA" accompanying each device indicates a physical address. In this case, the source device, the repeater device, and the sink device are all compatible with an extended function.

The sink device declares, in an HDMI VSDB, its own compatibility status about the functions defined by a conventional HDMI, so as to notify the upstream of the compatibility status. Likewise, the sink device declares, in a vendor VSDB, the existence/non-existence of compatibility with the extended function unique to the vendor.

The repeater device receives the HDMI VSDB and the vendor VSDB from the sink device. Therefore, the repeater device edits/changes the received HDMI VSDB and vendor VSDB in accordance with its own configuration/capability and compatibility, as well as the configuration/capability and compatibility status declared by the sink device, and then transmits the HDMI VSDB and the vendor VSDB to the source device or notifies the source device of the HDMI VSDB and the vendor VSDB.

The source device determines the signal to be output based on the contents of the HDMI VSDB and the vendor VSDB received from the repeater device, and, if necessary, transmits an HDMI VSIF (Vendor Specific InfoFrame) and a vendor VSIF, so as to perform transmission while notifying downstream devices (the repeater device and the sink device) of the contents of the output signal. At this point, the repeater device passes the VSIF received from the source device on to the sink device (Pass Through), without changing the contents of the VSIF.

FIG. 10 is a schematic diagram illustrating a problem that may occur in a transmission/reception system formed with a source device, a repeater device, and a sink device. In this drawing, "PA" accompanying each device indicates a physical address. In this case, the source device and the sink device are compatible with an extended function, but the repeater device is not compatible with the extended function.

The sink device declares, in an HDMI VSDB, its own compatibility status about the functions defined by a conventional HDMI, so as to notify the upstream of the compatibility status. Likewise, the sink device declares, in a vendor VSDB, the existence/non-existence of compatibility with the extended function unique to the vendor.

The repeater device receives the HDMI VSDB and the vendor VSDB from the sink device. The repeater device can comprehend the contents of the HDMI VSDB. Therefore, the repeater device edits/changes the received HDMI VSDB in accordance with its own configuration/capability and compatibility, as well as the configuration/capability and compatibility status declared therein by the sink device, and then transmits the HDMI VSDB to the source device or notifies the source device of the HDMI VSDB.

However, the repeater device cannot comprehend the contents of the vendor VSDB. Therefore, the repeater device does not edit/change the contents of the vendor VSDB, and transmits the vendor VSDB to the source device or notifies the source device of the vendor VSDB as it is.

The source device determines the signal to be output based on the contents of the received HDMI VSDB and vendor VSDB, and, if necessary, transmits an HDMI VSIF and a vendor VSIF, so as to perform transmission while notifying downstream devices (the repeater device and the sink device) of the contents of the output signal.

At this point, the repeater device passes the VSIF received from the source device on to the sink device (Pass Through), without changing the contents of the VSIF. In many cases, a function added by a vendor VSDB or a vendor VSIF is not affected even if the function is not comprehended by a repeater device. Also, a repeater device is designed to cope with sink devices and source devices manufactured by a larger number of manufacturers, and therefore, does not cause a serious problem in the above described situation.

However, in a case where a new function involving a change in the PHY specification or the like is added between devices of a vendor, a non-compatible repeater device receives a signal it cannot cope with, if the above described checking method using VSDBs and VSIFs is employed. As a result, the input circuit thereof might be damaged.

The present technology aims to avoid damaging a device that is not compatible with a functional extension.

Solutions to Problems

A concept of the present technology lies in an electronic device that includes:

a signal receiving unit that receives a signal from an external device through a transmission channel;

a storage unit that stores a data block containing capability information indicating existence/non-existence of compatibility with an extended function; and an information transmitting unit that transmits the stored data block to the external device through the transmission channel, wherein a layer field indicating a connection layer is provided in the data block.

In the present technology, the signal receiving unit receives the signal from the external device through the transmission channel. The storage unit stores the data block containing the capability information indicating the existence/non-existence of compatibility with the extended function. The layer field that indicates the connection layer is provided in this data block. The information transmitting unit transmits the data block stored in the storage unit to the external device through the transmission channel.

A functional extension may be a change in the PHY (physical layer) specification or compatibility with a new application, for example. A change in the PHY specification may be an increase in the transmission rate, an increase in the number of transmission lanes, a change in the coding method, a change in the signal amplitude, a change in the clock transmission method, a support in bidirectional transmission, a mode to transmit data other than video data, or the like. Compatibility with a new application may be compatibility with a new 3D format, a new 3D video transmission method, compatibility with or a transmission method for a new video format, a new audio transmission method, a high-efficiency video transmission method, compatibility with a new inter-device control method, or the like.

For example, the signal receiving unit may receive the signal in the form of a differential signal from the external device through the transmission channel. In this case, the transmission channel may be an HDMI cable, and the data block may be a vendor VSDB, for example. The electronic device may further include an image display unit that displays an image on an image display element based on a video signal included in the signal received by the receiving unit, for example.

As described above, in the present technology, the layer field indicating the connection layer is provided in the data block that contains the capability information indicating the existence/non-existence of compatibility with the extended function and is transmitted to the external device. Accordingly, in a case where the external device is an electronic device existing between the electronic device that outputs the signal and yet another electronic device, the electronic device increments the value of the layer field is incremented only when comprehending the contents of the data block. In this manner, the electronic device that outputs the signal can determine whether all the devices existing in the path are compatible with the extended function. The electronic device that outputs the signal can determine the contents of the transmission signal based on a result of the determination, and can avoid damaging an electronic device that exists in the path and is not compatible with the extended function.

Another concept of the present technology lies in an electronic device that includes:

a signal transmitting unit that transmits a signal to an external device through a transmission channel; and an information receiving unit that receives a data block sent from the external device through the transmission channel, the data block containing capability information indicating existence/non-existence of compatibility with an extended function, wherein a layer field indicating a connection layer is provided in the data block, and the electronic device further includes a control unit that determines whether all devices existing in a path are compatible with the extended function based on a value of the layer field, and determines contents of the signal to be transmitted.

In the present technology, the signal transmitting unit transmits the signal to the external device through the transmission channel. Also, the information transmitting unit receives the data block that is sent from the external device through the transmission channel and contains the capability information indicating the existence/non-existence of compatibility with the extended function. The layer field that indicates the connection layer is provided in this data block.

The control unit determines whether all the devices existing in the path are compatible with the extended function based on the value of the layer field provided in the data block, and then determines the contents of the signal to be transmitted. For example, the control unit may determine whether all the devices existing in the path are compatible with the extended function based on whether the value of the layer field corresponds to the number of the devices existing in the path. In this case, the control unit may recognize the number of the devices existing in the path based on the physical address of the electronic device, for example.

For example, the signal transmitting unit may transmit the signal in the form of a differential signal to the external device through the transmission channel. In this case, the transmission channel may be an HDMI cable, and the data block may be a vendor VSDB, for example. The electronic device may further include a signal output unit that outputs a signal, for example. In this case, the signal output unit may be a disc reproducing unit, for example.

In the present technology described above, a check is made to determine whether all the devices existing in the path are compatible with the extended function based on the value of the layer field provided in the data block, and the contents of the signal to be transmitted are determined based on a result of the check. Accordingly, it is possible to avoid damaging an electronic device that exists in the path and is not compatible with the extended function.

In the present technology, the electronic device may further include an information transmitting unit that transmits contents information to the external device through the transmission channel, the contents information indicating the determined contents of the signal, for example. In this case, the information transmitting unit may transmit the contents information inserted into a blanking period of a video signal forming the signal. Accordingly, the electronic device that receives the signal can readily recognize the contents of the signal based on the contents information.

Yet another concept of the present technology lies in an electronic device that includes:

a signal receiving unit that receives a signal from a first external device through a transmission channel;

a signal transmitting unit that transmits the received signal to a second external device through a transmission channel;

an information receiving unit that receives a data block sent from the second external device through the transmission channel, the data block containing capability information indicating existence/non-existence of compatibility with an extended function, a layer field indicating a connection layer being provided in the data block;

an information processing unit that processes the received data block in accordance with whether contents of the received data block are comprehended; and an information transmitting unit that transmits the data block output from the information processing unit to the first external device through the transmission channel, wherein, when the contents of the data block are comprehended, the information processing unit outputs the received data block after performing at least a process to change a value of the layer field, and when the contents of the data block are not comprehended, the information processing unit outputs the received data block without any change.

In the present technology, the signal receiving unit receives the signal from the first external device through the transmission channel, and the signal transmitting unit transmits the received signal to the second external device through the transmission channel. Also, the information receiving unit receives the data block that is sent from the second external device through the transmission channel and contains the capability information indicating the existence/ non-existence of compatibility with the extended function, the layer field indicating the connection layer being provided in the data block.

For example, the signal receiving unit may receive the signal in the form of a differential signal from the first external device through the transmission channel, and the signal transmitting unit may transmit the signal in the form of a differential signal to the second external device through the transmission channel. In this case, the transmission channel may be an HDMI cable, and the data block may be a vendor VSDB, for example.

The information transmitting unit transmits the data block output from the information processing unit to the first external device through the transmission channel. When the contents of the data block are comprehended, the information processing unit outputs the received data block after performing at least a process to change the value of the layer field. When the contents of the data block are not comprehended, the information processing unit outputs the received data block without any change. In this case, the process to change the value of the layer field may be a process to increment the value of the layer field, for example. Alternatively, in this case, the process to change the value of the layer field may be a process to set a layer bit thereof in the layer field.

As described above, in the present technology, the value of the layer field provided in the data block to be transmitted from the second electronic device to the first electronic device is changed only when the contents of the data block are comprehended. Accordingly, the electronic device that outputs the signal can determine whether all the devices existing in the path are compatible with the extended function based on the value of the layer field. The electronic device that outputs the signal can determine the contents of the transmission signal based on a result of the determination, and can avoid damaging an electronic device that exists in the path and is not compatible with the extended function.

Effects of the Invention

According to the present technology, it is possible to avoid damaging a device that is not compatible with a functional extension.

BRIEF DESCRIPTION OF DRAWINGS

FIG. 4 is a diagram schematically showing an example data structure of a vendor VSDB.

MODES FOR CARRYING OUT THE INVENTION

The following is a mode for carrying out the invention (hereinafter referred to as the "embodiment"). Explanation will be made in the following order.

1. Embodiment
2. Modifications

<1. Embodiment>

[Example Configuration of a Transmission/Reception System]

Figure 1:
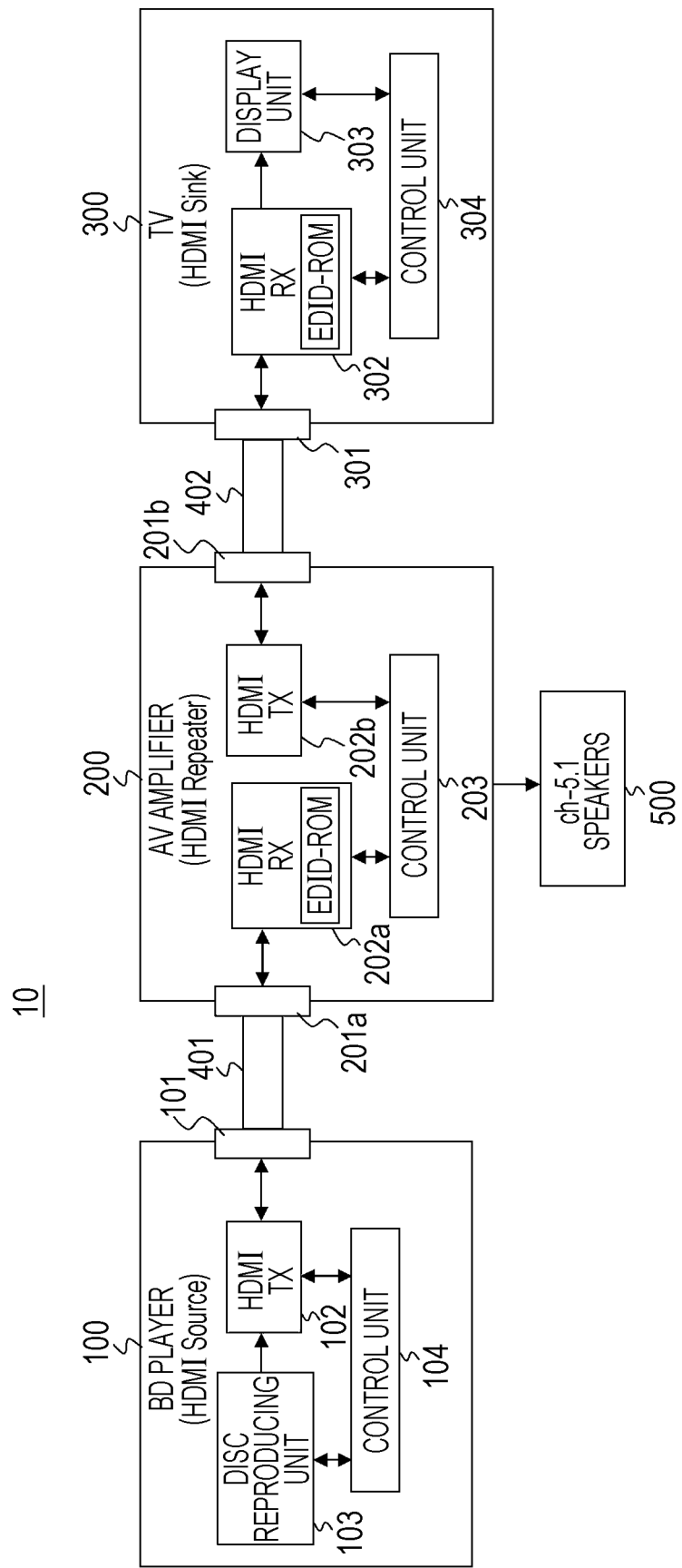
FIG. 1 is a block diagram showing an example configuration of a transmission/reception system as an embodiment.

FIG. 1 shows an example of a transmission/reception system 10 as an embodiment. This transmission/reception system 10 includes a BD (Blu-ray Disc) player 100 as a source device, an AV amplifier 200 as a repeater device, and a television receiver 300 as a sink device.

The BD player 100 is provided with an HDMI terminal 101 to which an HDMI transmitting unit (HDMI TX) 102 is connected. The television receiver 300 is provided with an HDMI terminal 301 to which an HDMI receiving unit (HDMI RX) 302 is connected. The AV amplifier 200 is provided with an HDMI terminal 201a to which an HDMI receiving unit (HDMI RX) 202a is connected, and an HDMI terminal 201b to which an HDMI transmitting unit (HDMI TX) 202b is connected.

The BD player 100 and the AV amplifier 200 are connected via an HDMI cable 401. Specifically, one end of the HDMI cable 401 is connected to the HDMI terminal 101 of the BD player 100, and the other end of the HDMI cable 401 is connected to the HDMI terminal 201a of the AV amplifier 200. The AV amplifier 200 and the television receiver 300 are connected via an HDMI cable 402. Specifically, one end of the HDMI cable 402 is connected to the HDMI terminal 201b of the AV amplifier 200, and the other end of the HDMI cable 402 is connected to the HDMI terminal 301 of the television receiver 300.

Figure 2:
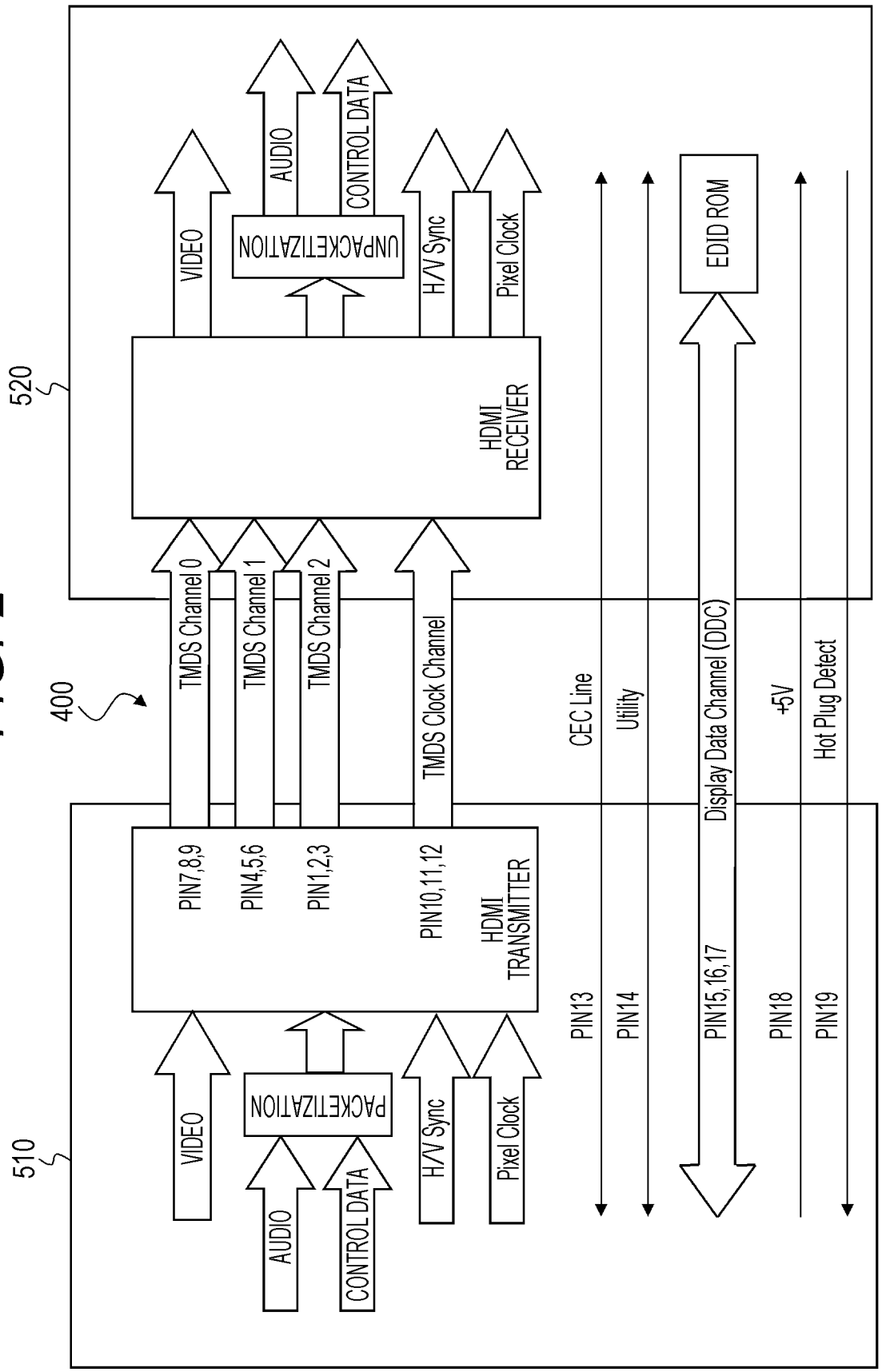
FIG. 2 is a diagram showing example structures of an HDMI transmitting unit and an HDMI receiving unit that constitute a transmission/reception system.

FIG. 2 shows an example configuration of the transmission system in the transmission/reception system 10 shown in FIG. 1, or example structures of an HDMI transmitting unit 510 (the HDMI transmitting units 102 and 202b) and an HDMI receiving unit 520 (the HDMI receiving units 202a and 302).

In an effective image period (also referred to as an "active video period"), the HDMI transmitting unit 510 unidirectionally transmits differential signals corresponding to uncompressed video data of a screen to the HDMI receiving unit 520 through channels.

An effective image period is a period calculated by subtracting the horizontal blanking period and the vertical blanking period from the period from one vertical synchronization signal to the next vertical synchronization signal. In a horizontal blanking period or a vertical blanking period, the HDMI transmitting unit 510 unidirectionally transmits differential signals corresponding to at least audio data, control data, other auxiliary data, and the like accompanying video data, to the HDMI receiving unit 520 through the channels.

In an active video period, the HDMI receiving unit 520 receives differential signals corresponding to video data transmitted unidirectionally from the HDMI transmitting unit 510 through the channels. In a horizontal blanking period or a vertical blanking period, the HDMI receiving unit 520 also receives differential signals corresponding to audio data and control data transmitted unidirectionally from the HDMI transmitting unit 510 through the channels.

The transmission channels in the transmission system formed with the HDMI transmitting unit 510 and the HDMI receiving unit 520 include the following channels. First of all, the transmission channels include differential signal channels (TMDS channels and a TMDS clock channel). There are three differential signal channels for transmitting digital signals of video data and the like.

The differential signal channels are now described. As shown in FIG. 2, there are three TMDS channels #0 through #2 as the transmission channels for serially transmitting video data and audio data unidirectionally from the HDMI transmitting unit 510 to the HDMI receiving unit 520 in synchronization with a TMDS clock. Also, there is a TMDS clock channel as the transmission channel for transmitting the TMDS clock.

An HDMI transmitter of the HDMI transmitting unit 510 converts uncompressed video data into corresponding differential signals, for example, and then serially transmits the differential signals, through the three TMDS channels #0, #1, and #2, unidirectionally to the HDMI receiving unit 520 connected thereto via an HDMI cable 400. Also, the HDMI transmitter converts the audio data accompanying the uncompressed video data, as well as necessary control data, other auxiliary data, and the like, into the corresponding differential signals, and unidirectionally and serially transmits the differential signals to the HDMI receiving unit 520 connected thereto via the HDMI cable 400, through the three TMDS channels #0, #1, and #2.

Further, the HDMI transmitter transmits the TMDS clock synchronized with the video data being transmitted through the three TMDS channels #0, #1, and #2, to the HDMI receiving unit 520 connected thereto via the HDMI cable 400, through the TMDS clock channel. Here, through one TMDS channel #i (i=0, 1, or 2), 10-bit video data is transmitted during one clock of the TMDS clock.

In synchronization with a TMDS clock, an HDMI receiver of the HDMI receiving unit 520 receives the differential signals corresponding to the video data transmitted unidirectionally from the HDMI transmitting unit 510 through the TMDS channels #0, #1, and #2, and the differential signals corresponding to the audio data and the control data. This TMDS clock is the TMDS clock transmitted from the HDMI transmitting unit 510.

Other than the above described TMDS channels and the TMDS clock channel, the transmission channels of the transmission system include transmission channels called a DDC (Display Data Channel) and a CEC line. The DDC is formed with two signal lines (not shown) included in the HDMI cable 400. The DDC is used by the HDMI transmitting unit 510 to read E-EDID (Enhanced Extended Display Identification Data) from the HDMI receiving unit 520.

That is, other than the HDMI receiver, the HDMI receiving unit 520 includes an EDID ROM (EEPROM) that stores E-EDID that is the information about its own configuration/capability. In response to a request from a control unit, for example, the HDMI transmitting unit 510 reads, through the DDC, the E-EDID from the HDMI receiving unit 520 connected thereto via the HDMI cable 400.

The HDMI transmitting unit 510 sends the read E-EDID to the control unit. The control unit stores this E-EDID into a flash ROM or DRAM (not shown). Based on the E-EDID, the control unit can recognize the settings of the configuration/capability of the HDMI receiving unit 520.

The CEC line is formed with one signal line (not shown) included in the HDMI cable 400, and is used for performing bidirectional communications of control data between the HDMI transmitting unit 510 and the HDMI receiving unit 520. The HDMI cable 400 also includes a line (HPD line) connected to a pin called HPD (Hot Plug Detect). The source device can use the HPD line to detect a connection with the sink device.

This HPD line is also used as a HEAC-line forming a bidirectional communication channel. The HDMI cable 400 also includes a power line (+5 V Power Line) to be used for supplying power from the source device to the sink device. The HDMI cable 400 further includes a utility line. This utility line is also used as a HEAC+ line forming a bidirectional communication channel.

Figure 3:
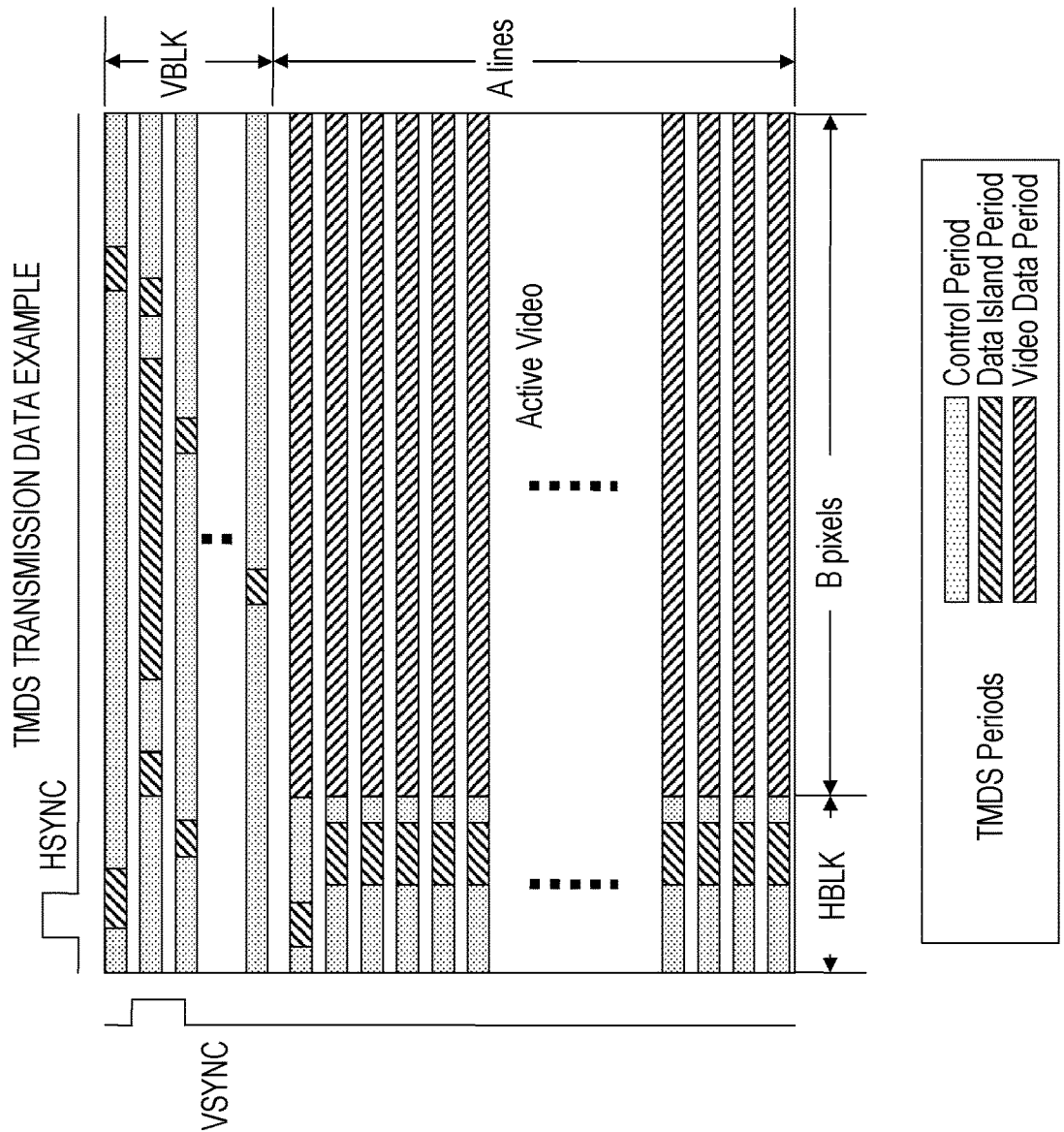
FIG. 3 is a diagram showing an example structure of TMDS transmission data.

FIG. 3 shows an example structure of TMDS transmission data. FIG. 3 illustrates periods of various kinds of transmission data in a case where image data of B pixels×A lines in size is transmitted through the TMDS channels #0 through #2. In the video field in which transmission data is transmitted through the TMDS channels, three kinds of periods exist depending on transmission data types. The three kinds of periods are video data periods, data island periods, and control periods.

A video field period is a period from the active edge of a vertical synchronization signal to the active edge of the next vertical synchronization signal. The video field period is divided into horizontal blanking intervals, vertical blanking intervals, and active video periods. The video data periods that are the video field period minus the horizontal blanking intervals and the vertical blanking intervals are assigned to the active video periods. In the video data periods, data of active pixels equivalent to B pixels×A lines, which constitute uncompressed image data of one screen, is transmitted.

The data island periods and the control periods are assigned to the horizontal blanking intervals and the vertical blanking intervals. In the data island periods and the control periods, auxiliary data is transmitted. That is, the data island periods are assigned to some portions of the horizontal blanking intervals and the vertical blanking intervals. In the data island periods, data unrelated to control in the auxiliary data, such as packets of audio data and the like, is transmitted. The control periods are assigned to the other portions of the horizontal blanking intervals and the vertical blanking intervals. In the control periods, data related to control in the auxiliary data, such as vertical synchronization signals, horizontal synchronization signals, control packets, and the like, is transmitted.

Referring back to FIG. 1, the BD player 100 includes a disc reproducing unit 103, a control unit 104, and the like, as well as the HDMI transmitting unit 102. The control unit 104 controls the respective components of the BD player 100. The television receiver 300 includes a display unit 303 formed with an image display element such as a liquid crystal display element or an organic EL display element, a control unit 304, and the like, as well as the HDMI receiving unit 302. The control unit 304 controls the respective components of the television receiver 300. The AV amplifier 200 includes a control unit 203 and the like, as well as the HDMI receiving unit 202a and the HDMI transmitting unit 202b. The control unit 203 controls the respective components of the AV amplifier 200.

The HDMI transmitting unit 102 of the BD player 100 transmits video signals and audio signals reproduced by the disc reproducing unit 103 to the AV amplifier 200, using a TMDS (Transition Minimized Differential Signaling) channel of an HDMI. The HDMI transmitting unit 202b of the AV amplifier 200 transmits the video signals received by the HDMI receiving unit 202a to the television receiver 300, using a TMDS channel of an HDMI. The AV amplifier 200 also supplies the audio signals received by the HDMI receiving unit 202a to external ch-5.1 speakers 500. The television receiver 300 supplies the video signals received by the HDMI receiving unit 302 to the display unit 303.

The television receiver 300 includes an EDID ROM (Read Only Memory) in the HDMI receiving unit 302. This EDID ROM stores E-EDID (Enhanced Extended Display Identification Data), which is the information about the configuration/capability of the television receiver 300. The HDMI receiving unit 302 of the television receiver 300 transmits this E-EDID to the AV amplifier 200.

This E-EDID includes an HDMI VSDB and a vendor VSDB. The television receiver 300 declares, in the HDMI VSDB, its own compatibility status about the functions defined by a conventional HDMI, so as to notify the upstream of the compatibility status. The television receiver 300 declares, in the vendor VSDB, the existence/non-existence of compatibility with an extended function unique to the vendor, so as to notify the upstream of the existence/non-existence. In this embodiment, a layer field that indicates the connection layer is provided in the vendor VSDB.

A functional extension may be a change in the PHY (physical layer) specification or compatibility with a new application, for example. A change in the PHY specification may be an increase in the transmission rate, an increase in the number of transmission lanes, a change in the coding method, a change in the signal amplitude, a change in the clock transmission method, a support in bidirectional transmission, a mode to transmit data other than video data, or the like. Compatibility with a new application may be compatibility with a new 3D format, a new 3D video transmission method, compatibility with or a transmission method for a new video format, a new audio transmission method, a high-efficiency video transmission method, compatibility with a new inter-device control method, or the like.

FIG. 4 schematically shows an example data structure of a vendor VSDB. This vendor VSDB is formed with the (N+1) bytes of the 0th through Nth bytes. In the 0th byte, a header indicating that the vendor VSDB is the data region of data "Vender Specific Data Block" represented by "Vendor-Specific tag code (=3)" is placed. In the 0th byte, information indicating the length of the data "Vender Specific Data Block" represented by "Length (=N)" is placed. In the first through third bytes, information represented by "24-bit IEEE Registration Identifier" is placed. A 2-bit layer field is placed in the seventh and sixth bits of the fourth byte.

Referring back to FIG. 1, the HDMI transmitting unit 202b of the AV amplifier 200 receives the E-EDID transmitted from the television receiver 300. The AV amplifier 200 includes an EDID ROM (Read Only Memory) in the HDMI receiving unit 202a. This EDID ROM stores E-EDID (Enhanced Extended Display Identification Data), which is the information about the configuration/capability of the AV amplifier 200.

Under the control of the control unit 203, the AV amplifier 200 edits/changes the E-EDID of the television receiver 300 received by the HDMI transmitting unit 202b in accordance with its own configuration/capability and compatibility status, and the HDMI receiving unit 202a transmits the E-EDID to the BD player 100.

The HDMI VSDB and the vendor VSDB are now described. In a case where the AV amplifier 200 can comprehend the contents of the vendor VSDB received from the television receiver 300, the AV amplifier 200 increments the value of the layer field placed in the vendor VSDB. In this case, the AV amplifier 200 also edits/changes the other values in both of the VSDBs in accordance with its own configuration/capability and compatibility status, as well as the configuration/capability and compatibility of the television receiver 300 declared therein. In a case where the AV amplifier 200 cannot comprehend the contents of the vendor VSDB received from the television receiver 300, on the other hand, the AV amplifier 200 edits/changes only the HDMI VSDB in accordance with its own configuration/capability and compatibility status. Since the vendor VSDB is not changed in this case, the value of the layer field remains "0".

The HDMI transmitting unit 102 of the BD player 100 receives the E-EDID transmitted from the AV amplifier 200. Based on the value of the layer field in the vendor VSDB, the control unit 104 determines whether all the devices (the repeater device) existing in the path, or the AV amplifier 200 in this case, is compatible with the extended function indicated by the vendor VSDB.

In this case, if the value of the layer field corresponds to the number of electronic devices existing in the path, or "1" in this case, the control unit 104 determines that all the devices existing in the path are compatible with the extended function indicated by the vendor VSDB. The control unit 104 can recognize the number of the devices existing in the path from the physical address of its own (of the BD player 100).

Based on a determination result, the control unit 104 determines the contents of the signal to be output from the HDMI transmitting unit 102. Specifically, when determining that all the devices existing in the path are compatible with the extended function indicated by the vendor VSDB, the control unit 104 takes both the HDMI VSDB and the vendor VSDB into account, and determines an output signal in accordance with the configuration/capability and the compatibility status declared in both of the VSDBs.

In this case, the HDMI transmitting unit 102 transmits a signal together with an HDMI VSIF and a vendor VSIF as necessary. As a result, the electronic device that receives the signal can readily recognize that the transmitted signal is designed to cope with the configuration/capability including the extended function based on the HDMI VSIF and the vendor VSIF.

When determining that all the devices existing in the path are not compatible with the extended function indicated by the vendor VSDB, the control unit 104 takes only the HDMI VSDB into account, and determines an output signal in accordance with the configuration/capability and the compatibility status indicated only by the HDMI VSDB.

In this case, the HDMI transmitting unit 102 outputs a signal together with an HDMI VSIF as necessary. As a result, the electronic device that receives the signal can readily recognize that the transmitted signal is not designed to cope with the configuration/capability including the extended function based on the HDMI VSIF.

Operation of the transmission/reception system 10 shown in FIG. 1 is now briefly described. The E-EDID stored in the EDID ROM included in the HDMI receiving unit 302 of the television receiver 300 is transmitted from the HDMI receiving unit 302 to the HDMI transmitting unit 202*b* of the AV amplifier 200. This E-EDID includes the HDMI VSDB in which its own compatibility status about the functions defined by a conventional HDMI is declared, and the vendor VSDB in which the existence/non-existence of compatibility about the extended function unique to the vendor is declared, and the layer field indicating the connection layer is provided.

Under the control of the control unit 203, the AV amplifier 200 edits/changes the E-EDID of the television receiver 300 received by the HDMI transmitting unit 202*b* in accordance with its own configuration/capability and compatibility status, and the HDMI receiving unit 202*a* transmits the E-EDID to the HDMI transmitting unit 102 of the BD player 100.

In this case, the HDMI VSDB and the vendor VSDB are edited/changed as follows. Specifically, when the contents of the vendor VSDB received from the television receiver 300 are comprehended, the value of the layer field placed in the vendor VSDB is incremented. In this case, the other values in both of the VSDBs are edited/changed in accordance with its own configuration/capability and compatibility status, as well as the configuration/capability and compatibility of the television receiver 300 declared therein.

In a case where the contents of the vendor VSDB received from the television receiver 300 cannot be comprehended, on the other hand, only the HDMI VSDB is edited/changed in accordance with its own configuration/capability and compatibility status. Since the vendor VSDB is not changed in this case, the value of the layer field remains "0".

Based on the value of the layer field in the vendor VSDB included in the E-EDID transmitted from the AV amplifier 200, the BD player 100 determines whether all the devices existing in the path are compatible with the extended function indicated by the vendor VSDB. Based on the determination result, the BD player 100 determines the contents of the signal to be transmitted from the HDMI transmitting unit 102.

In other words, when compatibility is recognized, both the HDMI VSDB and the vendor VSDB are taken into account, and the contents of the transmission signal (output) are determined in accordance with the configuration/capability and the compatibility status declared in both of the VSDBs. When compatibility is not recognized, on the other hand, only the HDMI VSDB is taken into account, and the contents of the transmission signal (output) are determined in accordance with the configuration/capability and the compatibility status indicated only by this HDMI VSDB.

A signal containing a video signal and an audio signal reproduced by the disc reproducing unit 103 is transmitted from the HDMI transmitting unit 102 of the BD player 100. The contents of the signal to be transmitted in this manner are determined based on the layer field in the vendor VSDB as described above.

In this case, when a transmission signal is determined in accordance with the configuration/capability and the compatibility status declared in both the HDMI VSDB and the vendor VSDB, an HDMI VSIF and a vendor VSIF are added during a video signal blanking period as necessary. When a transmission signal is determined in accordance with the configuration/capability and the compatibility status only by the HDMI VSDB, an HDMI VSIF is added during a video signal blanking period as necessary.

The video signal transmitted from the BD player 100 is supplied to the television receiver 300 via the HDMI cable 401, the AV amplifier 200, and the HDMI cable 402, and an image is displayed on the display unit 303 of the television receiver 300. The audio signal transmitted from the BD player 100 is supplied to the AV amplifier 200 via the HDMI cable 401, is processed by the AV amplifier 200, and is then supplied to the external ch-5.1 speakers 500, for example. Sound is output from the speakers 500.

Figure 5:
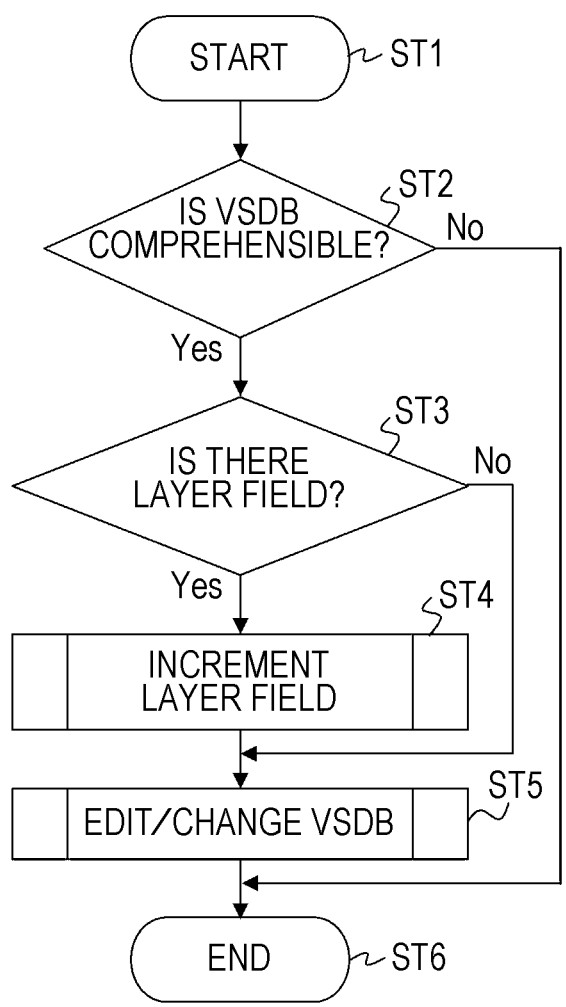
FIG. 5 is a flowchart showing an example of the procedures in a process to be performed on a vendor VSDB by the control unit of the AV amplifier.

The flowchart in FIG. 5 shows an example of the procedures in a process to be performed on the vendor VSDB by the control unit 203 of the AV amplifier 200. In step ST1, the control unit 203 starts the process, and then moves on to the procedure in step ST2. In step ST2, the control unit 203 determines whether the contents of the vendor VSDB are comprehensible. If the contents of the vendor VSDB are determined not to be comprehensible, the control unit 203 move on to step ST6, and ends the process. In this case, any editing/changing process is not performed on the vendor VSDB.

If the contents of the vendor VSDB are determined to be comprehensible in step ST2, the control unit 203 moves on to the procedure in step ST3. In step ST3, the control unit 203 determines whether the vendor VSDB includes the layer field. If the control unit 203 determines that the vendor VSDB does not include the layer field, the control unit 203 moves on to the procedure in step ST5. In step ST5, the control unit 203 performs an editing/changing process on the vendor VSDB in accordance with its own configuration/capability and compatibility status. After that, the control unit 203 moves on to step ST6, and ends the process.

If the control unit 203 determines that the vendor VSDB includes the layer field in step ST3, the control unit 203 moves on to the procedure in step ST4. In step ST4, the control unit 203 increments the value of the layer field in the vendor VSDB. In step ST5, the control unit 203 then performs an editing/changing process on the vendor VSDB in accordance with its own configuration/capability and compatibility status. After that, the control unit 203 moves on to step ST6, and ends the process.

Figure 6:
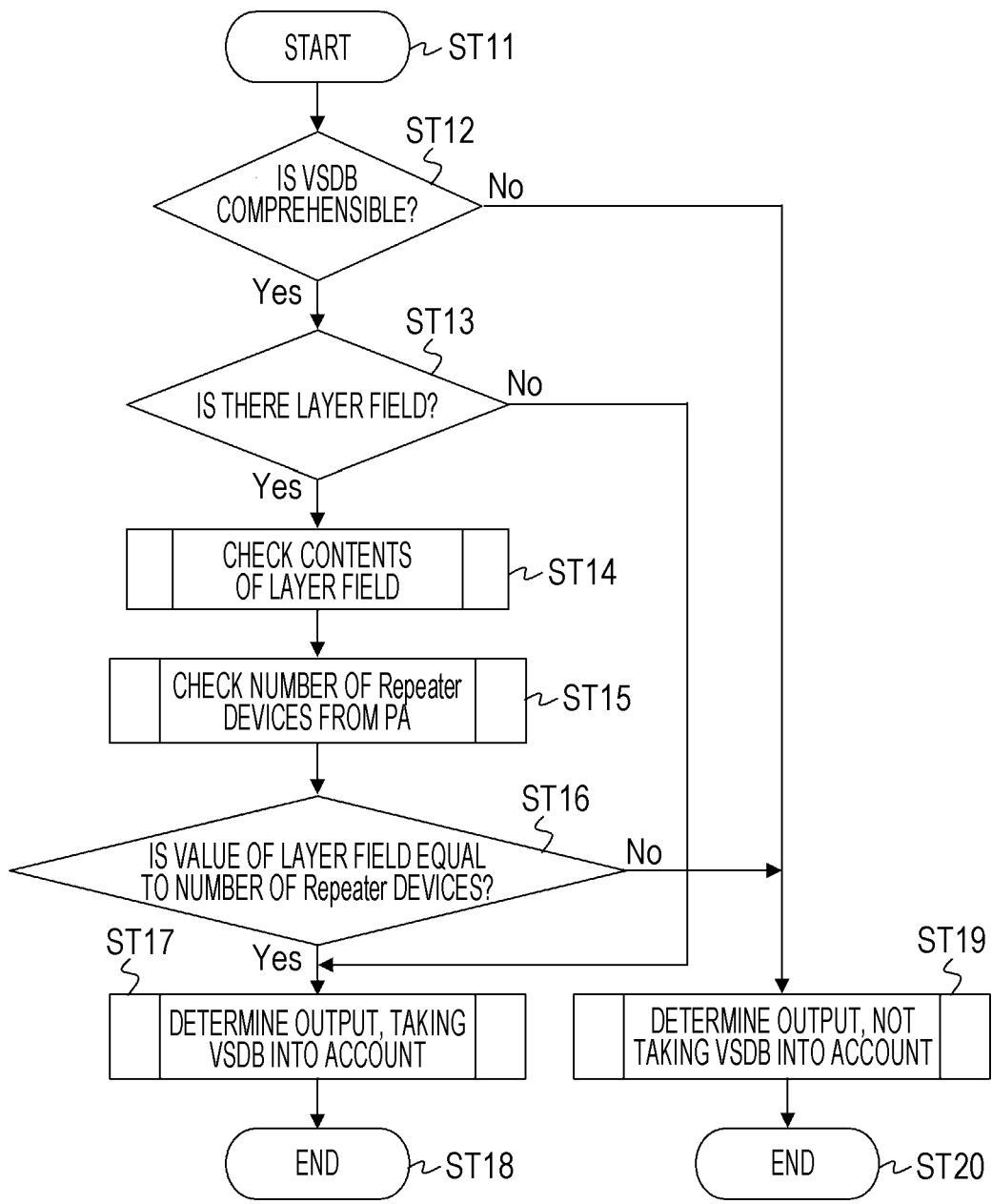
FIG. 6 is a flowchart showing an example of the procedures in a process to be performed on a vendor VSDB by the control unit of the BD player.

The flowchart in FIG. 6 shows an example of the procedures in a process to be performed on the vendor VSDB by the control unit 104 of the BD player 100. In step ST11, the control unit 104 starts the process, and then moves on to the procedure in step ST12. In step ST12, the control unit 104 determines whether the contents of the vendor VSDB are comprehensible. If the contents of the vendor VSDB are determined not to be comprehensible, the control unit 104 moves on to the procedure in step ST19. In step ST19, the control unit 104 determines the contents of the transmission signal (output), not taking the vendor VSDB into account. After that, the control unit 104 moves on to step ST20, and ends the process.

If the contents of the vendor VSDB are determined to be comprehensible in step ST12, the control unit 104 moves on to the procedure in step ST13. In step ST13, the control unit 104 determines whether the vendor VSDB includes the layer field. If the control unit 104 determines that the vendor VSDB does not include the layer field, the control unit 104 moves on to the procedure in step ST17. In step ST17, the control unit 104 determines the contents of the transmission signal (output), taking the vendor VSDB into account. After that, the control unit 104 moves on to step ST18, and ends the process.

If the control unit 104 determines that the vendor VSDB includes the layer field in step ST13, the control unit 104 in step ST14 checks the contents (value) of the layer field. In step ST15, the control unit 104 checks the number of repeater devices from its own physical address (PA). After that, the control unit 104 moves on to step ST16.

In step ST16, the control unit 104 determines whether the value of the layer field matches the number of repeater devices. If the control unit 104 determines that the value of the layer field matches the number of repeater devices, the control unit 104 moves on to the procedure in step ST17. In step ST17, the control unit 104 determines the contents of the transmission signal (output), taking the vendor VSDB into account. After that, the control unit 104 moves on to step ST18, and ends the process.

If the control unit 104 determines that the value of the layer field does not match the number of repeater devices in step ST16, the control unit 104 moves on to the procedure in step ST19. In step ST19, the control unit 104 determines the contents of the transmission signal (output), not taking the vendor VSDB into account. After that, the control unit 104 moves on to step ST20, and ends the process.

Figure 7:
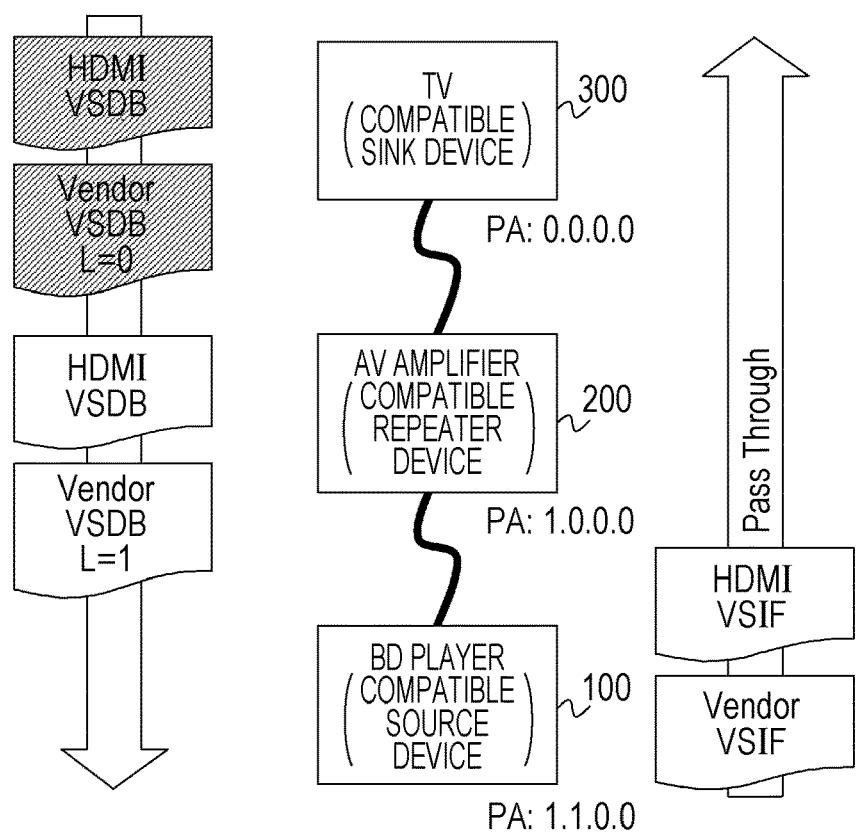
FIG. 7 is a schematic diagram illustrating operation of the transmission/reception system to which the present technology is applied.

FIG. 7 is a schematic diagram illustrating operation of the transmission/reception system 10 to which the present technology is applied. In this drawing, "PA" accompanying each device indicates a physical address. In this case, the BD player 100, the AV amplifier 200, and the television receiver 300 are all compatible with an extended function.

The television receiver 300 serving as the sink device declares, in an HDMI VSDB, its own compatibility status about the functions defined by a conventional HDMI, so as to notify the upstream of the compatibility status. Likewise, the television receiver 300 declares, in a vendor VSDB, the existence/non-existence of compatibility with the extended function unique to the vendor. Here, a layer field that indicates the connection layer is provided in the vendor VSDB. As described above, this layer field increments its own value when the repeater device having received a vendor VSDB can comprehend the contents of the vendor VSDB, and notifies the upstream of the vendor VSDB.

The AV amplifier 200 serving as the repeater device receives the HDMI VSDB and the vendor VSDB from the television receiver 300. Being compatible with the extended function, the AV amplifier 200 can comprehend the contents of the vendor VSDB. Therefore, the AV amplifier 200 edits/changes the received HDMI VSDB and vendor VSDB in accordance with its own configuration/capability and compatibility, as well as the configuration/capability and compatibility status declared by the television receiver 300, and then transmits the HDMI VSDB and the vendor VSDB to the source device or notifies the source device of the HDMI VSDB and the vendor VSDB. At this point, the AV amplifier 200 increments the value (L) of the layer field in the vendor VSDB.

The BD player 100 serving as the source device receives the HDMI VSDB and the vendor VSDB from the AV amplifier 200. The BD player 100 checks that the value (L) of the layer field in the vendor VSDB is "1". From its own physical address (PA), which is "1.1.0.0" in this case, the BD player 100 can recognize that one repeater device exists in its own connection path.

Since the value (L) of the layer field is "1", the BD player 100 recognizes that all the repeater devices existing in the path are compatible with the extended function indicated by the vendor VSDB. Therefore, the BD player 100 determines the contents of a transmission signal in accordance with the configuration/capability including a new function declared in both of the VSDBs, and outputs the signal together with an HDMI VSIF and a vendor VSIF if necessary.

Figure 8:
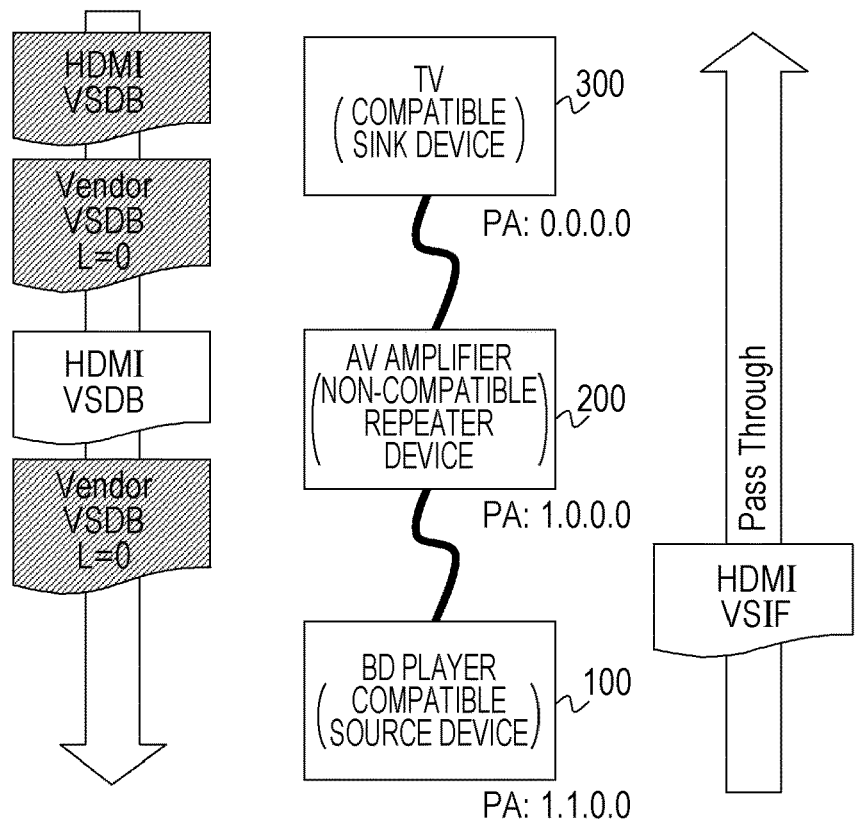
FIG. 8 is a schematic diagram illustrating that the problem of the conventional art is solved in the transmission/reception system to which the present technology is applied.
Figure 9:
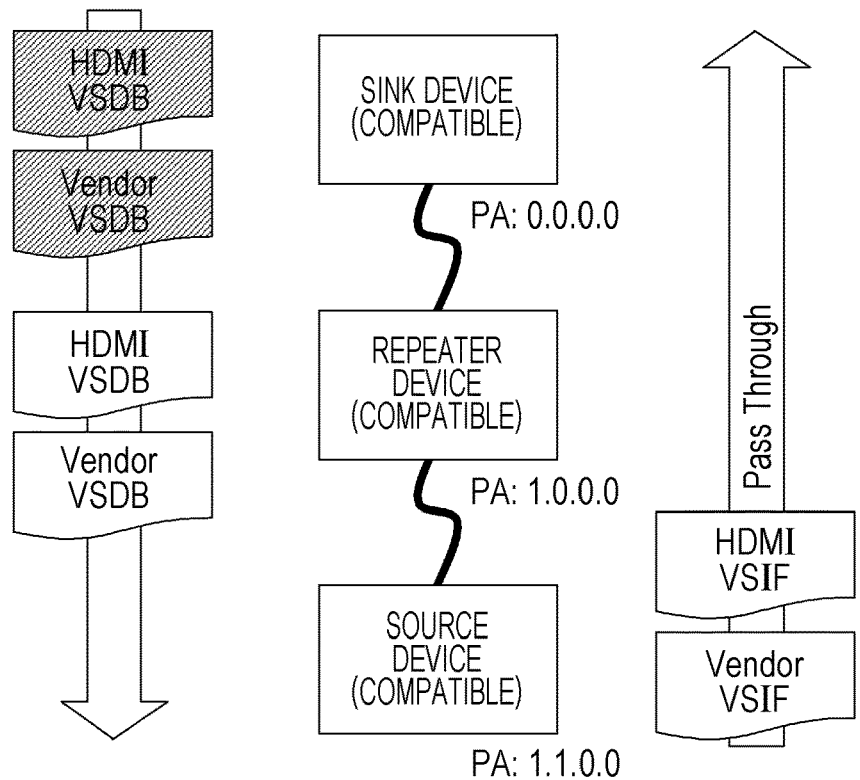
FIG. 9 is a schematic diagram illustrating operation that is originally expected in a transmission/reception system formed with a source device, a repeater device, and a sink device.
Figure 10:
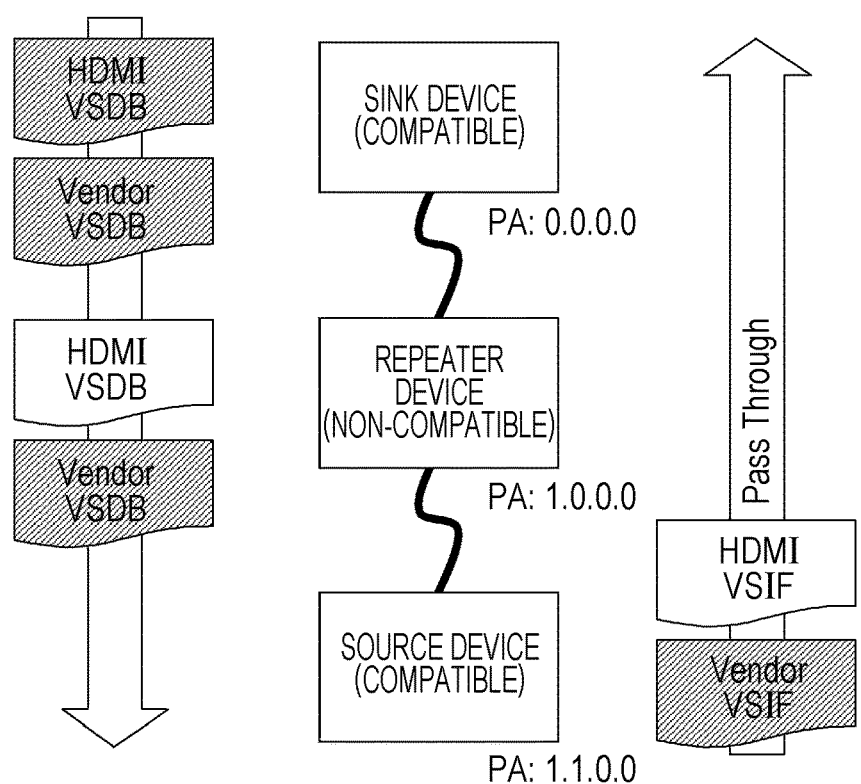
FIG. 10 is a schematic diagram illustrating a problem that may occur in a transmission/reception system formed with a source device, a repeater device, and a sink device.

FIG. 8 is a schematic diagram illustrating that the transmission/reception system 10 to which the present technology is applied solves the problem described above with reference to FIG. 10. In this drawing, "PA" accompanying each device indicates a physical address. In this case, the BD player 100 and the television receiver 300 are compatible with an extended function, but the AV amplifier 200 is not compatible with the extended function.

The television receiver 300 serving as the sink device declares, in an HDMI VSDB, its own compatibility status about the functions defined by a conventional HDMI, so as to notify the upstream of the compatibility status. Likewise, the television receiver 300 declares, in a vendor VSDB, the existence/non-existence of compatibility with the extended function unique to the vendor. Here, a layer field that indicates the connection layer is provided in the vendor VSDB. As described above, this layer field increments its own value when the repeater device having received a vendor VSDB can comprehend the contents of the vendor VSDB, and notifies the upstream of the vendor VSDB.

The AV amplifier 200 serving as the repeater device receives the HDMI VSDB and the vendor VSDB from the television receiver 300. Being not compatible with the extended function, the AV amplifier 200 cannot comprehend the contents of the vendor VSDB. Therefore, only the contents of the HDMI VSDB are edited/changed in accordance with its own configuration/capability and compatibility, and the HDMI VSDB is transmitted to the source device, or the source device is notified of the HDMI VSDB. Since the contents of the vendor VSDB are not changed in this case, the value (L) of the layer field remains "0".

The BD player 100 serving as the source device receives the HDMI VSDB and the vendor VSDB from the AV amplifier 200. The BD player 100 checks that the value (L) of the layer field in the vendor VSDB is "0". From its own physical address (PA), which is "1.1.0.0" in this case, the BD player 100 can recognize that one repeater device exists in its own connection path.

Since the value (L) of the layer field is "0", the BD player 100 recognizes that all the repeater devices existing in the path are not compatible with the extended function indicated by the vendor VSDB, and recognizes that it is not possible to cope with the new function indicated by the vendor VSDB in this path. Therefore, the BD player 100 determines the contents of a transmission signal in accordance with the configuration/capability and the compatibility status indicated by a conventional HDMI VSDB, and outputs the signal together with an HDMI VSIF as necessary.

As described above, in the transmission/reception system 10 shown in FIG. 1, the BD player 100 can recognize whether the repeater device (the AV amplifier 200) existing between the BD player 100 and the television receiver 300 is compatible with the extended function unique to the vendor based on the value of the layer field in the vendor VSDB.

Accordingly, the BD player 100 can output a signal compatible with all the repeater devices existing in the path, and can avoid damaging a device that is not compatible with a functional extension. As a result, an addition of a greater function, such as a change in the PHY specification that would damage a device not compatible with a functional extension using a vendor VSDB, can be realized with safety.

<2. Modifications>

In the example structure of the above described embodiment, a layer field indicating the connection layer is provided in a vendor VSDB, and the repeater device increments the value of the layer field when comprehending the contents of the vendor VSDB. In some other example structure, however, the repeater device may set its own layer bit in the layer field when comprehending the contents of the vendor VSDB.

That is, the present technology can be realized not only by a method of incrementing the value of the layer field when the repeater device can comprehend the VSDB, but alto by setting a field indicating its own layer in the field corresponding to the layer at the physical address allocated by an HDMI. This will be described below in detail, with reference to the drawings.

In the configuration shown in FIG. 7, the AV amplifier 200 and the BD player 100 read the HDMI VSDB from the television receiver 300 and the AV amplifier 200, respectively, so that physical addresses are assigned thereto. In the HDMI VSDB, a 4-bit field of A, B, C, and D exists in each of bytes 4 and 5.

The sink device (the television receiver 300 in this case) that is the root device (having a physical address "0.0.0.0") sets a terminal number ("1" in this case) in the field A for the device (the AV amplifier 200 in this case) connected to its own HDMI terminal, so that a physical address "1.0.0.0" is assigned to the AV amplifier 200.

Likewise, the AV amplifier 200 sets a terminal number ("1" in this case) in the field B for the device (the BD player 100 in this case) connected to its own HDMI terminal, so that a physical address "1.1.0.0" is assigned to the BD player 100. A maximum of five devices can be connected to the path of an HDMI, and a physical address is assigned to each of the devices in the above manner.

With this mechanism, a value exists in the field A for the device connected to the upstream side of the root device, and a value exists in the field B for the device connected to an upper stream side. As a value exists in one of the fields A, B, C, and D of the physical address, the layer of its own can be recognized.

Therefore, the three bits A, B, and C (the field D invariably represents the source device, and therefore, is unnecessary) are prepared as the layer field in a vendor VSDB to which the present technology is applied. In the layer field in the vendor VSDB, the connected repeater device sets "1" in the bit (layer bit) of the layer assigned by the downstream device connected directly thereto (the AV amplifier 200 in this case has an address assigned to A by the television receiver 300 connected directly to the downstream side thereof).

The source device (the BD player 100 in this case) can recognize that a repeater device exists between the source device and the sink device (the television receiver 300 in this case) from its own physical address ("1.1.0.0" in this case). As a value is set in the field A in the layer field, it is possible to recognize that the repeater device comprehends the vendor VSDB.

Likewise, at a deeper layer, the source device can also recognize that a repeater device existing in the path comprehends the vendor VSDB and has corrected the vendor VSDB in accordance with the configuration/capability thereof.

In the above described example of the transmission/reception system 10 of the embodiment, the source device is the BD player 100, the sink device is the television receiver 300, and the repeater device is the AV amplifier 200. However, the respective devices are not limited to the devices described in this embodiment. Also, the number of the devices constituting a transmission/reception system is not limited to three.

For example, other than the three devices of the above described embodiment, repeater devices such as HDMI switchers may be added, and up to five devices as defined in the HDMI Specification can be employed. In that case, a maximum of three repeater devices can exist between the source device and the sink device, and two bits should be enough for a layer field according to the present technology.

Also, in the above described embodiment, the present technology is applied to a transmission/reception system in which the respective devices are connected by digital interfaces compliant with the HDMI Specification. However, the present technology is not limited to that, and can of course be applied to a transmission/reception system in which devices are connected by digital (wireless or cable) interfaces compliant to other similar standards.

The present technique may also be embodied in the structures described below.

(1) An electronic device including:
a signal receiving unit that receives a signal from an external device through a transmission channel;
a storage unit that stores a data block containing capability information indicating existence/non-existence of compatibility with an extended function; and
an information transmitting unit that transmits the stored data block to the external device through the transmission channel,
wherein a layer field indicating a connection layer is provided in the data block.

(2) The electronic device of (1), wherein the signal receiving unit receives the signal in the form of a differential signal from the external device through the transmission channel.

(3) The electronic device of (2), wherein the transmission channel is an HDMI cable, and the data block is a vendor VSDB.

(4) The electronic device of any of (1) through (3), further including an image display unit that displays an image on an image display element based on a video signal included in the signal received by the receiving unit.

(5) A method of transmitting a data block containing capability information indicating existence/non-existence of compatibility with an extended function in an electronic device that receives a signal from an external device through a transmission channel, the method including transmitting the data block including a layer field indicating a connection layer.

(6) An electronic device including:

a signal transmitting unit that transmits a signal to an external device through a transmission channel; and an information receiving unit that receives a data block sent from the external device through the transmission channel, the data block containing capability information indicating existence/non-existence of compatibility with an extended function, wherein a layer field indicating a connection layer is provided in the data block, and the electronic device further includes a control unit that determines whether all devices existing in a path are compatible with the extended function based on a value of the layer field, and determines contents of the signal to be transmitted.

(7) The electronic device of (6), wherein the control unit determines whether all the devices existing in the path are compatible with the extended function based on whether the value of the layer field corresponds to the number of the devices existing in the path.

(8) The electronic device of (7), wherein the control unit recognizes the number of the devices existing in the path based on a physical address of the electronic device.

(9) The electronic device of any of (6) through (8), further including an information transmitting unit that transmits contents information to the external device through the transmission channel, the contents information indicating the determined contents of the signal.

(10) The electronic device of (9), wherein the information transmitting unit transmits the contents information inserted into a blanking period of a video signal forming the signal.

(11) The electronic device of any of (6) through (10), wherein the signal transmitting unit transmits the signal in the form of a differential signal to the external device through the transmission channel.

(12) The electronic device of (11), wherein the transmission channel is an HDMI cable, and the data block is a vendor VSDB.

(13) A method of determining contents of a transmission signal in an electronic device that transmits a signal to an external device through a transmission channel, the method including:

receiving a data block from the external device through the transmission channel, the data block containing capability information indicating existence/non-existence of compatibility with an extended function, a layer field indicating a connection layer being provided in the data block;

determining whether all devices existing in a path are compatible with the extended function based on a value of the layer field; and determining contents of the transmission signal based on a result of the determination.

(14) An electronic device including:

a signal receiving unit that receives a signal from a first external device through a transmission channel;

a signal transmitting unit that transmits the received signal to a second external device through a transmission channel;

an information receiving unit that receives a data block sent from the second external device through the transmission channel, the data block containing capability information indicating existence/non-existence of compatibility with an extended function, a layer field indicating a connection layer being provided in the data block;

an information processing unit that processes the received data block in accordance with whether contents of the received data block are comprehended; and an information transmitting unit that transmits the data block output from the information processing unit to the first external device through the transmission channel, wherein, when the contents of the data block are comprehended, the information processing unit outputs the received data block after performing at least a process to change a value of the layer field, and when the contents of the data block are not comprehended, the information processing unit outputs the received data block without any change.

(15) The electronic device of (14), wherein the process to change the value of the layer field is a process to increment the value of the layer field.

(16) The electronic device of (14), wherein the process to change the value of the layer field is a process to set a layer bit thereof in the layer field.

(17) The electronic device of any of (14) through (16), wherein the signal receiving unit receives the signal in the form of a differential signal from the first external device through the transmission channel, and the signal transmitting unit transmits the signal in the form of a differential signal to the second external device through the transmission channel.

(18) The electronic device of (17), wherein the transmission channel is an HDMI cable, and the data block is a vendor VSDB.

(19) A method of transmitting a data block received from a second external device through a transmission channel in an electronic device that receives a signal from a first external device through a transmission channel and transmits the received signal to the second external device through a transmission channel, the data block containing capability information indicating existence/non-existence of compatibility with an extended function, a layer field indicating a connection layer being provided in the data block, the method including:

a first step of processing the received data block in accordance with whether contents of the received data block are comprehended, and outputting a transmission data block; and a second step of transmitting the transmission data block to the first external device through the transmission channel, wherein, when the contents of the data block are comprehended, the first step includes outputting the received data block after performing at least a process to change a value of the layer field, and when the contents of the data block are not comprehended, the first step includes outputting the received data block without any change.

(20) A transmission/reception system including a first electronic device, a second electronic device, and a predetermined number of third electronic devices placed in a path between the first electronic device and the second electronic device, wherein the first electronic device includes:
a signal transmitting unit that transmits a signal to an external device through a transmission channel;
an information receiving unit that receives a data block sent from the external device through the transmission channel, the data block containing capability information indicating existence/non-existence of compatibility with an extended function, a layer field indicating a connection layer being provided in the data block; and
a control unit that determines whether all devices existing in a path are compatible with the extended function based on a value of the layer field, and determines contents of the signal to be transmitted,
the second electronic device includes:
a signal receiving unit that receives a signal from an external device through a transmission channel;
a storage unit that stores a data block containing capability information indicating existence/non-existence of compatibility with an extended function, a layer field indicating a connection layer being provided in the data block; and
an information transmitting unit that transmits the stored data block to the external device through the transmission channel, and
the third electronic devices include:
a signal receiving unit that receives a signal from a first external device through a transmission channel;
a signal transmitting unit that transmits the received signal to a second external device through a transmission channel;
an information receiving unit that receives a data block sent from the second external device through the transmission channel, the data block containing capability information indicating existence/non-existence of compatibility with an extended function, a layer field indicating a connection layer being provided in the data block;
an information processing unit that processes the received data block in accordance with whether contents of the received data block are comprehended; and
an information transmitting unit that transmits the data block output from the information processing unit to the first external device through the transmission channel,
wherein,
when the contents of the data block are comprehended, the information processing unit outputs the received data block after performing at least a process to change a value of the layer field, and
when the contents of the data block are not comprehended, the information processing unit outputs the received data block without any change.

REFERENCE SIGNS LIST

10 Transmission/reception system
100 BD player
101 HDMI terminal
102 HDMI transmitting unit
103 Disc reproducing unit
104 Control unit
200 AV amplifier
201a, 201b HDMI terminal
202a HDMI receiving unit
202b HDMI transmitting unit
203 Control unit
300 Television receiver
301 HDMI terminal
302 HDMI receiving unit
303 DISPLAY UNIT
304 Control unit
400, 401, 402 HDMI cable
500 ch-5.1 speakers

The invention claimed is:
1. An electronic device, comprising:
an information receiving unit configured to receive Enhanced Extended Display Identification Data (E-EDID) from a first external device of a plurality of external devices, wherein
the E-EDID comprises a high definition multimedia interface (HDMI) vendor specific data block (VSDB) and a vendor VSDB,
the HDMI VSDB indicates a compatibility status of the first external device,
the compatibility status of the first external device corresponds to a function associated with a conventional HDMI,
the vendor VSDB includes capability information that indicates existence of compatibility of the first external device with an extended function, and
the vendor VSDB comprises a layer field that indicates a connection layer in the vendor VSDB;
a control unit configured to:
determine content of the vendor VSDB is comprehensible, based on compatibility of the electronic device with the extended function; and
increment a value of the layer field in the vendor VSDB based on the determination the content of the vendor VSDB is comprehensible;
an information processing unit configured to:
change values of the HDMI VSDB based on a compatibility status of the electronic device, wherein the compatibility status of the electronic device corresponds to the function associated with the conventional HDMI; and
change values of the vendor VSDB based on the incremented value of the layer field; and
an information transmitting unit configured to transmit the HDMI VSDB including the changed values of the HDMI VSDB and the vendor VSDB including the changed values of the vendor VSDB to a second external device.
2. The electronic device according to claim 1, wherein the information processing unit is further configured to set a layer bit in the layer field.
3. The electronic device according to claim 1, further comprising:
a signal receiving unit configured to receive a first differential signal from the second external device via a first transmission channel; and
a signal transmitting unit configured to transmit a second differential signal to the first external device via a second transmission channel.
4. The electronic device according to claim 3, wherein at least one of the first transmission channel or the second transmission channel is a HDMI cable.
5. A method, comprising:
in an electronic device:
receiving Enhanced Extended Display Identification Data (E-EDID) from a first external device of a plurality of external devices, wherein
the E-EDID comprises a high definition multimedia interface (HDMI) vendor specific data block (VSDB) and a vendor VSDB,
the HDMI VSDB indicates a compatibility status of the first external device, the compatibility status of the first external device corresponds to a function associated with a conventional HDMI,
the vendor VSDB includes capability information that indicates existence of compatibility of the first external device with an extended function, and
the vendor VSDB comprises a layer field indicating a connection layer in the vendor VSDB;
determining content of the vendor VSDB is comprehensible, based on compatibility of the electronic device with the extended function;
incrementing a value of the layer field in the vendor VSDB based on the determination the content of the vendor VSDB is comprehensible;
changing values of the HDMI VSDB based on a compatibility status of the electronic device, wherein the compatibility status of the electronic device corresponds to the function associated with the conventional HDMI;
changing values of the vendor VSDB based on the incremented value of the layer field; and
transmitting the HDMI VSDB including the changed values of the HDMI VSDB and the vendor VSDB including the changed values of the vendor VSDB to a second external device.

6. A system, comprising:
a sink device of a plurality of devices;
at least one repeater device of the plurality of devices; and
a source device of the plurality of devices, wherein
the at least one repeater device is in between the sink device and the source device, and
the sink device comprises:
  a storage unit configured to store Enhanced Extended Display Identification Data (E-EDID), wherein
    the E-EDID comprises a high definition multimedia interface (HDMI) vendor specific data block (VSDB) and a vendor VSDB,
    the HDMI VSDB indicates a compatibility status of the sink device,
    the compatibility status of the sink device corresponds to a function associated with a conventional HDMI, and
    the vendor VSDB includes capability information that indicates existence of compatibility of the sink device with an extended function; and
  a first information transmitting unit configured to transmit, the stored E-EDID to the at least one repeater device, wherein the vendor VSDB comprises a layer field that indicates a connection layer in the vendor VSDB,
the at least one repeater device comprises:
  a first information receiving unit configured to receive the transmitted E-EDID from the sink device;
  a first control unit configured to increment a value of the layer field in the vendor VSDB based on compatibility of the at least one repeater device with the extended function;
  an information processing unit configured to:
    change values of the HDMI VSDB based on a compatibility status of the at least one repeater device, wherein the compatibility status of the at least one repeater device corresponds to the function associated with the conventional HDMI; and
    change values of the vendor VSDB based on the incremented value of the layer field; and
  a second information transmitting unit configured to transmit the HDMI VSDB including the changed values of the HDMI VSDB and the vendor VSDB including the changed values of the vendor VSDB to the source device, and
the source device comprises:
  a second information receiving unit configured to receive the transmitted HDMI VSDB and the transmitted vendor VSDB from the at least one repeater device; and
  a second control unit configured to determine compatibility status of at least one device of the plurality of devices with the extended function, based on the received HDMI VSDB and the received vendor VSDB.

* * * * *